Nov. 14, 1933.    H. E. WARREN    1,935,462
NON-SELF-STARTING SYNCHRONOUS MOTOR
Filed Nov. 16, 1932
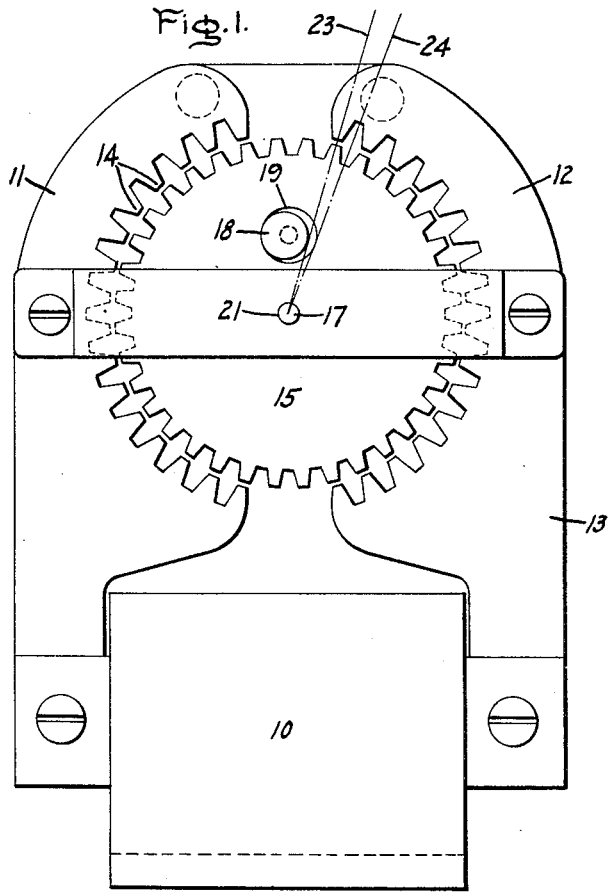
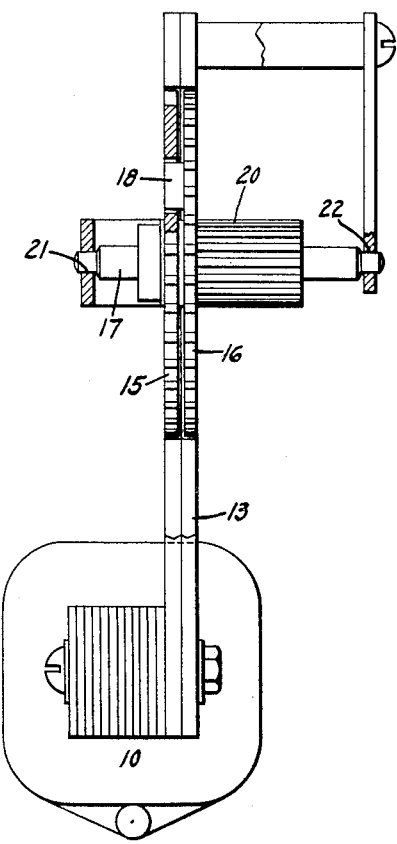
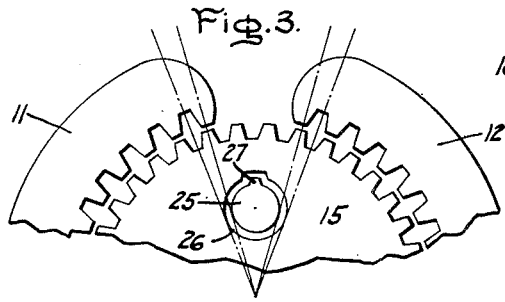
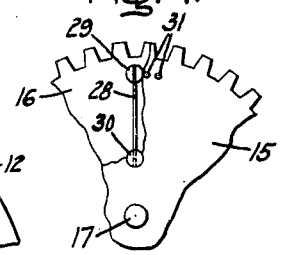
Inventor:
Henry E. Warren,
by *Chas. V. Mullan*
His Attorney.

Patented Nov. 14, 1933

1,935,462

UNITED STATES PATENT OFFICE 1,935,462

NON-SELF-STARTING SYNCHRONOUS MOTOR

Henry E. Warren, Ashland, Mass., assignor to Warren Telechron Company, Ashland, Mass., a corporation of Maine Application November 16, 1932
Serial No. 642,881

8 Claims. (Cl. 172—275)

My invention relates to synchronous motors of the non-self-starting type, and in particular to an arrangement to facilitate starting. An important aspect of the invention relates to a starting arrangement that is effective in a selected direction of rotation only.

In synchronous motors of the non-self-starting type, provision is made to spin the rotor by some external force to bring it up to or slightly above synchronous speed so that it will pull into step. In addition, such motors require some special synchronizing arrangement to assist this pulling in action. A motor of this character will run equally well in either direction, and the starting arrangements heretofore used operated equally well for either direction of rotation, so that it was equally possible to start the motor for operation in either direction.

In most cases the motor is used for driving purposes for one particular direction of rotation only, and in such cases it is advantageous to provide a starting arrangement according to my invention as is hereinafter described, which may be made effective in the desired direction of rotation only. Other advantages of my invention will be pointed out as the description proceeds.

The features of the invention which are believed to be novel and patentable will be pointed out in the claims appended hereto. For a better understanding of the invention, reference is made to the accompanying drawing, Figs. 1 and 2 of which show end and side views of a non-self-starting motor equipped with my improved starting device as arranged to be effective for one direction of rotation only, Fig. 3 shows how the device may be modified in case it is desired to start the motor in both directions of rotation; and Fig. 4 shows a modification using a resilient connection between the relatively rotatable rotor parts.

Referring to Figs. 1 and 2, 10 is a single phase energizing coil for producing an alternating flux between the pole pieces 11 and 12 of the stator member 13. The pole pieces have a number of evenly spaced inwardly projecting teeth 14 comprising salient poles arranged on the arc of a circle. The pole pieces embrace the magnetic rotor secondary having correspondingly spaced teeth comprising salient poles in its periphery co-operating with the salient poles of the primary. The stator is a usual form for this type of motor, but the rotor has certain novel features which will be described. As is known, this general form of motor if synchronized will produce synchronous torque and will rotate at a synchronous speed where a rotor tooth moves from one stator tooth to the next during a half cycle so as to intercept the alternating flux pulsations in the minimum reluctance positions.

The rotor comprises two toothed wheels 15 and 16 of the same dimensions and number of teeth. Wheel 15 is secured to the rotor shaft 17, and wheel 16 is free to turn on this shaft relative to rotor part 15 to the limited extent permitted by a lost motion coupling between the wheels. This coupling here comprises a pin 18 secured in wheel 16 and extending through a hole 19 of larger dimensions in wheel 15. Shaft 17 is provided with a pinion gear 20 for connection to a device to be driven, and is supported in bearings 21 and 22 in the motor framework. Both parts are within the influence of the salient poles of the stator.

The relative angular positions of rotor parts 15 and 16 shown in Fig. 1 is such that pin 18 rests against the left-hand side of opening 19. In this condition the peripheral teeth or salient poles of both rotor parts are in alignment, and this is the approximate normal condition when the rotor is running in synchronism. The relative dimensions of pin 18 and opening 19 are such that rotor part 16 can be rotated in a clockwise direction with respect to part 15 a distance corresponding to about one-half rotor tooth space or one-half the salient pole pitch before pin 18 will strike against the right-hand side of opening 19. This permissible limited relative angular movement of about one-half rotor tooth pitch between the two rotor parts is indicated by the angle between lines 23 and 24, Fig. 1.

I have found that this arrangement is effective in establishing synchronism in one direction of rotation only. The arrangement of Fig. 1 will synchronize when rotated in a clockwise direction. Apparently, magnetic, inertia and frictional phenomena are all involved in this synchronizing action, which may be explained as follows:

The drive shaft on which rotor shaft 15 is fastened is given a spin by hand or otherwise in a clockwise direction to bring the rotor to a speed above the synchronous value. On account of the rapid acceleration during the spinning process the teeth of the loose rotor 16 will take a position behind the teeth of the rotor 15 which is fast upon the shaft.

The lag of the rotor 16 will be that which is permitted by the pin 18 in the hole 19 amounting to about one-half of the pitch. This relative position of the two rotors will permit one or the other to lock into synchronism with the pulsating flux through the stator poles as soon as the rotor speed has slowed down to its synchronous value. Whichever rotor happens to lock into synchronism first will immediately develop driving power that will be available to force the other rotor into synchronism when the pin 18 engages one side or the other of the hole 19, depending upon which rotor first locked into synchronism.

The action is somewhat complicated by the small oscillations in speed which result when either of the rotors locks into synchronism. These speed oscillations are rapidly damped out by collisions between the coupling pin and the hole, due to the fact that the speed oscillations at locking-in differ in amplitude and phase in the two rotors. The bumping of the pin in the hole tends to smooth out the oscillations and produce a uniform average speed for both rotors.

One can very easily detect with the ear a clicking sound diminishing rapidly and then disappearing as the rotors lock into synchronism. After they have done so the teeth of the two rotors tend to maintain substantially the same phase relation with the pulsating field, provided the rotor is not heavily loaded. Pin 18 under these conditions remains out of contact with the sides of the hole.

Among the factors which influence the proper operation of this motor I believe that the mechanical resonance of the rotors in any given field is important. A similar phenomenon is described in my U. S. Patent No. 1,390,319. This resonance depends upon the strength and frequency of the magnetic flux and the amount of inertia of the rotors. A motor which will perform well at a given value of the magnetic flux corresponding to a definite value of the voltage applied to the coil 10 may not perform well at a different value of the voltage to the coil, either greater or less. The range of voltage change which is permissible is, however, ample for ordinary operating purposes. For example, a motor of this kind can be constructed which may be started manually in a satisfactory manner if the voltage is varied over a range of 40% of its value. It is easy, however, by holding proper values of inertia, width of air gap and density of flux to construct a motor which will operate satisfactorily over a much smaller range.

This motor when in operation usually carries the whole load by means of rotor 15 which is fast on the shaft 17. The loose rotor 16 is mainly effective in connection with starting, although it is also helpful in stabilizing the load-carrying rotor when there are sudden disturbances either of the load or of the power supply.

The loose rotor may under some conditions, if the loose coupling is sufficiently small, carry a small portion of an unusually heavy load. There may be other features besides those mentioned which facilitate the automatic synchronizing property of this motor, such as friction of the loose rotor on the shaft and the effect of the inertia of the load which is carried by the motor because of the fly wheel effect of other parts which are connected.

The above explanation may not be entirely correct. However, whatever the explanation, it has been found that if this mechanism as thus adjusted be rotated in the opposite direction the loose rotor part is apparently ineffective and has little, if any, assisting synchronizing action.

The extending portion of pin 18 may be made larger and eccentric to the part (shown in dotted lines, Fig. 1) fastened in wheel 16, so that by rotating it 180 degrees by means of a suitable tool the pin 18 will rest against the opposite side of the opening 19 when the rotor teeth are in alignment. The motor will then be adjusted for easy starting in the counter-clockwise direction of rotation.

In some instances it may be desirable to be able to start the motor in either direction of rotation, and in such cases the lost motion between the two rotor parts is made such as to allow the teeth in the loose rotor part 16 to move about one-half tooth distance either side of a position where the teeth in both rotor parts are in alignment. This arrangement is represented in Fig. 3.

In Fig. 3 the two rotor parts are shown positioned to have their teeth in alignment. The pin 25 extending from the loose rotor part is contained in an opening 26 in the rotor part 15, which, as in Fig. 1, is fastened to the motor drive shaft. With the pin 25 in the position shown, it is seen that the two rotor parts have free angular movement the distance of about one-half tooth pitch either direction from that where the rotor teeth are in alignment. This rotor may then be started in either direction and the loose rotor part will facilitate and assist synchronizing in either direction of rotation.

I may also provide an extension 27 on one side of that portion of pin 25 which is contained within the opening 26. The opening 26 may be enlarged slightly adjacent the extension 27 so that part 27 cannot make contact with the side of the opening and interfere with the relative movement of the two rotor parts as above explained when pin 25 is in the position shown. However, if pin 25 is now rotated a quarter turn in a counter-clockwise direction, the extension 27 will block relative movement of the loose rotor part to the left and we will have a combination that facilitates starting in a clockwise direction only. Similarly, if the pin 25 be rotated a quarter turn in a clockwise direction from the position shown, it will block relative movement of the loose rotor to the right, and the combination will then be adjusted to facilitate starting in a counter-clockwise direction only.

With the parts adjusted as shown in Fig. 3, pin 25 is out of contact with either side of the opening under normal running conditions. Also, I find that the mutual repulsion between the similarly polarized adjacent teeth of the two rotor parts tends to keep these rotor parts separated a slight extent (see Fig. 2). These features tend to make the motor quiet in operation. The loose rotor starting arrangement also comes into action upon sudden changes in load or changes in frequency, to assist in maintaining the motor in step. Some such arrangement permitting an automatic variation in the effective width of the salient poles of the rotor will be useful regardless of its starting function.

In Fig. 4 I have represented a still further modification where a resilient coupling comprising a spring member 28 is secured between the two rotor parts 15 and 16. As shown, this spring member is secured in pins 29 and 30 secured in rotor parts 16 and 15, respectively, and extending into the space between them where the spring member is located. The spring is of such resiliency that it will allow limited relative rotation of the rotor parts under the forces that present themselves at the time of establishing synchronism or hunting to assist in the synchronizing action and in keeping the rotor from falling out of step. Limiting stops may be provided so that this device will only be effective in one direction of rotation if desired, as explained in connection with the preceding figures. Thus, holes 31 may be provided in wheel 15 into which a pin may be secured to contact with pin 29 on one or the other side thereof, to limit the relative rotative movement between the rotor parts as desired in one direction or the other from the positions shown.

It will be evident to those skilled in the art that the detailed arrangements of the parts may be varied considerably from those illustrated without departing from the invention disclosed, and, consequently, I do not wish to be limited to these exact arrangements, but seek claims commensurate with the true spirit and scope of the invention.

What I claim as new and desire to secure by Letters Patent of the United States, is:

1. A synchronous motor having relatively rotatable primary and secondary members, the primary member having salient poles and means for producing an alternating flux thereat, the secondary means having a two part magnetic member, each part having salient poles spaced and positioned to cooperate with the salient poles of the primary member and to intercept the alternating flux pulsations of said poles at a synchronous speed of the motor, the two parts of said secondary member being relatively rotatable, and means for limiting the relative rotation of said secondary parts so that relative rotation thereof will not exceed a distance corresponding approximately to the salient pole pitch thereof and will include a relative rotative position where the salient poles of said two parts are in substantial alignment.

2. A non-self-starting synchronous motor having a primary stator member provided with a plurality of evenly spaced salient poles together with means for producing an alternating flux thereat, a rotor for said motor having two magnetic parts mounted side by side and each having a plurality of evenly spaced salient poles spaced and mounted to cooperate with the salient poles of the stator to intercept the alternating flux pulsations in a synchronous relation at the normal speed of the motor, a drive shaft to which one of said rotor parts is secured, the other rotor part being rotatably mounted with respect to said shaft, and means for limiting relative rotation of said rotor parts by an amount not exceeding approximately one-half the pole pitch in either direction from a position where the poles of said parts are in substantial alignment.

3. A non-self-starting synchronous motor comprising stator and rotor members each provided with a plurality of salient poles of magnetic material, a drive shaft on which said rotor member is secured, means on said stator member for producing an alternating flux through the salient poles of the stator and rotor members, the spacing of said poles being such as to produce synchronous torque at a speed proportional to the frequency of such alternating flux, and means for assisting the motor to fall into step in one direction of rotation only, comprising a second rotor member having a salient pole arrangement similar to the first mentioned rotor member and rotatably mounted closely adjacent and with respect to the first rotor member within the influence of the salient poles of the stator, and means for limiting relative rotation of said two rotor members to a distance corresponding to approximately one-half pole pitch in one direction only from a relative position of said two rotor members where their salient poles are in approximate alignment.

4. A non-self-starting synchronous motor having a salient pole stator and a salient pole rotor member, means on said stator for producing an alternating flux through the stator and rotor salient pole portions, said pole portions being spaced to cooperate with the flux pulsations to produce synchronous torque at a speed proportional to the frequency of such flux pulsations, and synchronizing means associated with said rotor member to assist the motor in falling into step, comprising a second salient pole member substantially similar to the first rotor member and rotatively mounted with respect to the first rotor member closely adjacent thereto within the influence of the salient pole portions of the stator, and means for limiting the relative amount of rotation between said rotor members, said last mentioned means being adjustable to make said synchronizing means selectively effective with respect to the direction of rotation of the motor.

5. A non-self-starting synchronous alternating current motor, synchronizing means for assisting the motor to fall into synchronism, and means for adjusting said synchronizing means for either direction of rotation of said motor and rendering it ineffective for the reverse direction of rotation.

6. A salient pole rotor member for synchronous motors, comprising a drive shaft, a toothed magnetic member secured on said shaft, a second toothed magnetic member similar to the first rotatively mounted with respect to the first, and a lost motion driving connection between said rotor members permitting limited relative rotation therebetween to vary the effective peripheral width of the salient poles of said rotor.

7. A salient pole rotor member for synchronous machines, comprising two sets of salient poles of magnetic material having the same polar pitch and mounted side by side on relatively rotatable members, together with means for resiliently limiting the relative rotation of such members from a position where the salient poles of the two sets are in substantial alignment, the arrangement serving to vary the effective peripheral width of the salient poles of the rotor.

8. A secondary rotor member for a non-self-starting synchronous motor, comprising a drive shaft, a toothed magnetic disc secured on said shaft, a second toothed disc with a tooth arrangement similar to the first rotatively mounted on said shaft closely adjacent the first disc, but with sufficient spacing between them that their sides do not touch, a pin extending from one disc into an opening of larger dimensions in the other disc and serving as a lost motion driving connection between said discs, and allowing relative rotation between the discs from a relative position where the teeth thereof are in alignment to a relative position where the same teeth are spaced approximately one-half tooth pitch apart.

HENRY E. WARREN.